United States Patent
Bryan et al.

(10) Patent No.: US 6,591,418 B2
(45) Date of Patent: Jul. 8, 2003

(54) FACTORY SOFTWARE MANAGEMENT SYSTEM

(75) Inventors: Joe Bryan, Cedar Park, TX (US); Steve Romohr, Austin, TX (US); Jon Boede, Round Rock, TX (US); Gaston Barajas, Cedar Park, TX (US); Paul J. Maia, Cedar Park, TX (US)

(73) Assignee: Dell U.S.A., L.P., Round Rock, TX (US)

( * ) Notice: Subject to any disclaimer, the term of this patent is extended or adjusted under 35 U.S.C. 154(b) by 0 days.

(21) Appl. No.: 09/277,062

(22) Filed: Mar. 26, 1999

(65) Prior Publication Data

US 2002/0188942 A1 Dec. 12, 2002

(51) Int. Cl.$^7$ ............................................... G06F 9/445
(52) U.S. Cl. ........................................ 717/177; 707/203
(58) Field of Search .......................... 717/11, 108–178; 707/203

(56) References Cited

U.S. PATENT DOCUMENTS

| | | |
|---|---|---|
| 5,155,847 A | 10/1992 | Kirouac et al. |
| 5,175,852 A | 12/1992 | Johnson et al. |
| 5,247,683 A | 9/1993 | Holmes et al. |
| 5,421,009 A | 5/1995 | Platt |
| 5,463,735 A | 10/1995 | Pascucci et al. |
| 5,471,617 A | 11/1995 | Farrand et al. |
| 5,742,829 A * | 4/1998 | Davis et al. ................. 717/178 |
| 5,764,992 A * | 6/1998 | Kullick et al. ............... 717/175 |
| 5,794,052 A | 8/1998 | Harding |
| 5,859,977 A * | 1/1999 | Nishiyama et al. .......... 709/223 |
| 5,960,204 A * | 9/1999 | Yinger et al. ................. 717/11 |
| 5,995,756 A * | 11/1999 | Herrmann ..................... 717/11 |
| 6,151,707 A * | 11/2000 | Hecksel et al. .............. 717/178 |
| 6,151,708 A * | 11/2000 | Pedrizetti et al. ............. 717/11 |
| 6,202,207 B1 * | 3/2001 | Donohue ..................... 717/11 |
| 6,279,030 B1 * | 8/2001 | Britton et al. ............... 709/203 |

* cited by examiner

Primary Examiner—Gregory Morse
Assistant Examiner—Chuck Kendall
(74) Attorney, Agent, or Firm—Haynes and Boone, LLP

(57) ABSTRACT

A system for factory installation of software that configures the storage resources in one or more file servers as a "cache." The factory installation system includes at least one file server coupled to a storage management engine (SME) which is coupled to a library server. A target customer system being loaded with software is coupled to the file servers and library server. The library server will have sufficient storage capacity to maintain all of the software that may be requested by a target customer system. The storage management engine will determine which software programs included on the file server memory have been the least recently used and delete those files, thus causing the remaining files on the server memory to be the most recently used. When a target customer computer is being loaded, a request is first made to the file severs for the desired software. If the desired programs are located on the file servers, then a download to the customer computer is implemented. However, if the requested software is not present, the customer computer then sends a request to the library server for the desired software and a download from the library server to the customer computer occurs. When the target customer system requests the file from the library server, the request is logged in a directory in the library server. Periodically, the SME will read the logged requests and then update the file server memories with software which has been requested by the customer computers.

28 Claims, 4 Drawing Sheets

FACTORY SOFTWARE MANAGEMENT SYSTEM

BACKGROUND

The present disclosure relates to the factory loading of software on a computer system. More particularly, a software installation system is provided which allows only the most recently used software to be stored on the file servers while the entire set of available software is resident on a library server.

It is common in the computer manufacturing industry to load, or bundle, specific software programs on the computers while they are still at the factory. This allows consumers to essentially custom order their computer systems by using a "build-to-order" process. There are literally thousands of possible software programs that a customer may need to be loaded on the computer being purchased. For example, there are numerous operating systems (OS), such as the Disk Operating System (DOS), Windows, OS/2, Unix, and the like. Additionally, application programs which run on these operating systems will also need to be installed. Various application programs include word processing programs, such as MS Word, Lotus WordPro, Corel WordPerfect, and the like. Many other application programs may also be requested by a particular end user. For example, spreadsheets, financial planners, electronic mail software, bill paying programs and the like are also available for selection by a customer. Further, the client computer system being loaded will also have a certain hardware configuration that requires specific factory installed software for hardware (FISH), i.e. device drivers, which are needed for the hardware components in the computer to operate. These drivers include printer drivers, mouse drivers, memory control software and the like. It should also be noted that software programs are continually being updated such that multiple versions of the same program are likely to exist. This adds to the number of software programs that must be maintained by the computer manufacturer for installation on customer systems. That is, many versions of DOS, Windows, Word, and the like exist and must be maintained.

Further, the previously described software is off-the-shelf programs and does not include any customer specific programs that must also be maintained. Large commercial customers often employ an in-house staff of programmers to develop specific programs to address the particular business needs of the commercial customer. For example, internally developed inventory software, process control programs and the like may be provided to the computer manufacturer for loading on a quantity of computer systems ordered by that commercial customer. This customer specific software must also be maintained by the computer manufacturer in the event a future order is placed by this customer.

It can be seen that the number of software programs that must be maintained by computer manufacturers for pre-loading is enormous. Further, this software continues to grow each year to take advantage of computer hardware enhancements, such as increased memory capacity. For example, the Windows 98 version has dramatically increased in size and is approximately 500 Megabytes (MB) in 500 files. However, it is not possible for computer manufactures to delete older versions of the various software since it is possible that a customer may request an older version of software and it is a primary goal of build-to-order manufacturing to meet customer requirements. The amount of software needed to be maintained by computer manufacturers can become virtually unmanageable if a practical solution is not found.

Typically, a computer manufacturing facility will include one or more file servers for storing the software programs available for loading onto customer systems. As the number of software programs available to customers increase, the memory capacity must be correspondingly expanded. It can be seen that continually increasing storage capacity of the file servers is only a temporary solution and will eventually become impractical, due to cost concerns and availability of storage resources.

Another possible solution is to use a hierarchical storage management (HSM) system which couples high capacity storage, such as optical storage, to the file server and uses specialized software to swap files between the optical storage and the file server memory. However, in many cases a computer manufacturing facility will include more than one file server. HSM systems are designed to work with only a single file server and can be modified to work with multiple file servers only by partitioning the optical storage between the file servers. That is, for "n" file servers, the optical storage will have "n" partitions. This effectively decreases the available storage to each file server, since it will only be able to access its assigned partition and the size of the partition is dependent on the number of file servers in the software installation system.

Therefore, it can be seen that a need exists for a factory software installation system that allows a large number of software programs to be managed without increasing the memory capacity of each file server in the system. Further, it would be desirable to have a system that allows for the addition of centralized storage capacity that will operate in conjunction with multiple file servers.

SUMMARY

Accordingly, provided is a system for factory installation of software that essentially configures the storage resources in one or more file servers as a "cache." A factory installation system includes at least one file server coupled to a storage management engine (SME) which is coupled to a library server. The storage management engine performs the basic file storage management functions for the factory software installation system. A target customer system being loaded with software is coupled to the file servers and library server. The library server will have sufficient storage capacity to maintain all of the software that may be requested by a target customer system. The storage management engine will determine which software programs included on the file server memory have been the least recently used and delete those files, thus causing the remaining files on the server memory to be the most recently used.

When a customer computer is being loaded, a request is made to the file servers for the desired software. If the desired programs are located on the file servers, then a download to the customer computer is implemented. However, if the requested software is not present, the customer computer then sends a request to the library server for the desired software and a download from the library server to the customer computer occurs. When the target customer system requests the file from the library server, the request is logged in the library server. Periodically, the SME will read the logged requests and then update the file server memories with software which has been requested by the target client computers. Therefore, the most recently requested software is maintained on the file servers with the least recently used programs being stored on the library server. By maintaining the least recently used programs on the library server, storage capacity for the newer (and typically larger) software is made available on the file servers. Other aspects of the system are contained in the subsequent description and the appended claims taken in conjunction with the accompanying drawings.

DETAILED DESCRIPTION OF THE PREFERRED EMBODIMENTS

Dell Computer Corporation is a manufacturer of computer systems and has numerous facilities with factory installed download application (FIDA) systems. These FIDA systems are used to bundle software programs on target computers which have been order by a customer. The FIDA systems are a critical component in the manufacturing process and system customization process. As the diversity in operating systems and applications have grown and as diversity in hardware configurations has expanded, the capacity demand on the FIDA servers holding this data in the manufacturing facilities has increased dramatically. The factory FIDA servers store data from several sources that ultimately is used in the installation of software to be delivered as part of the customer order. A significant portion of the software is delivered to the servers through the automated file promotion (AFP) process which is used to deliver operating systems, device drivers and applications to target customer computers. Storage space on the FIDA servers may become insufficient as newer and larger programs are scheduled to be delivered to the servers.

A great number of the data files delivered and stored on the FIDA servers are not frequently used, but must be available for the occasional system orders that require this specific data. Based on statistical analysis, it was determined that as many as 70% of the files have been unused during the last 180 days.

Figure 1:
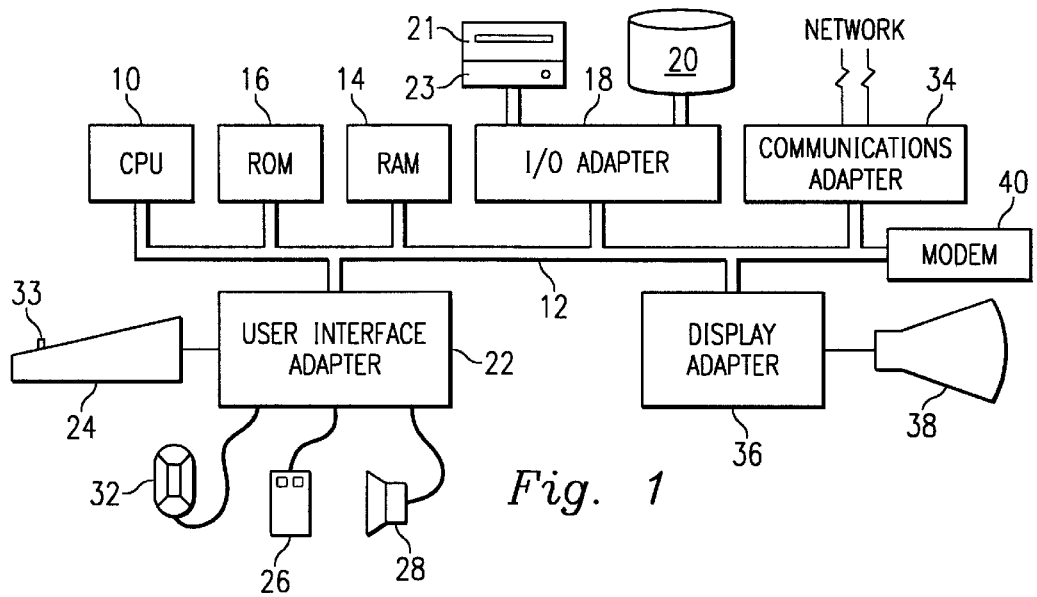
FIG. 1 is a block diagram of a typical target client computer system which may be configured in accordance with the present system.
Figure 2:
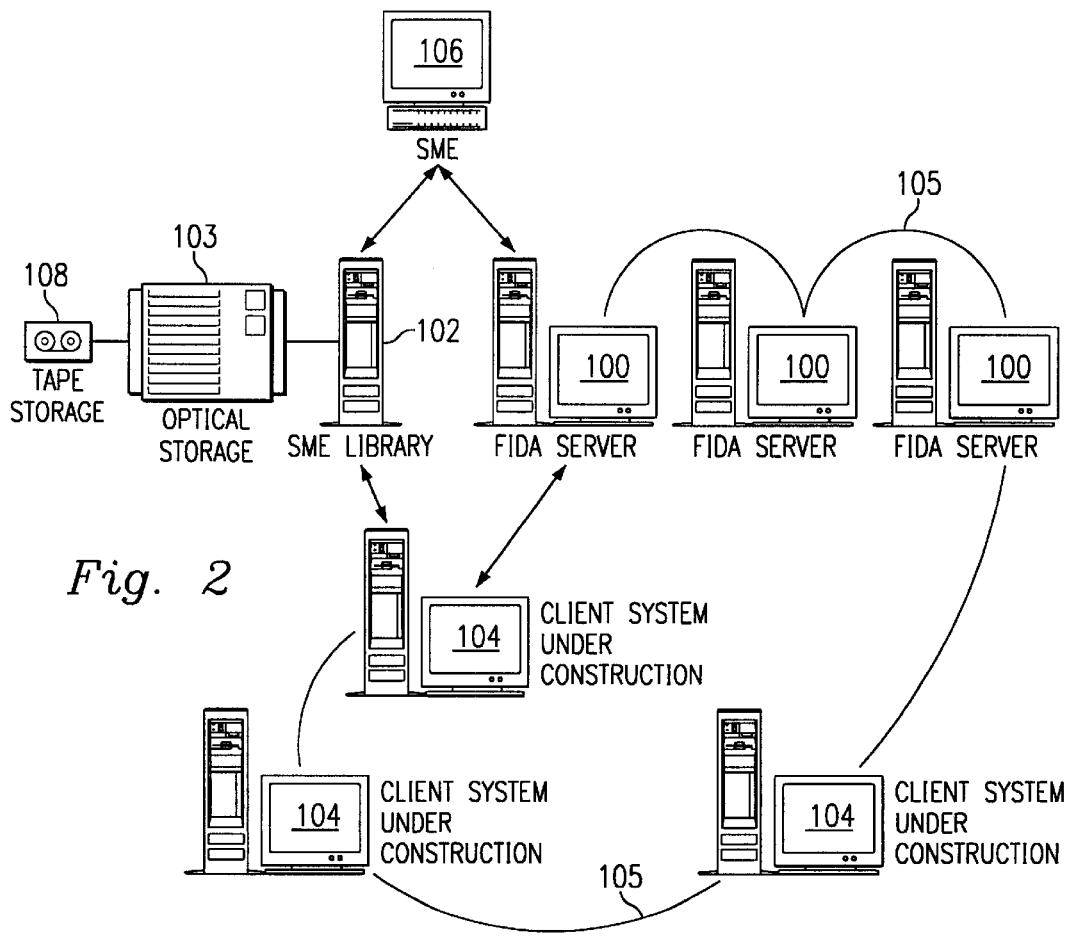
FIG. 2 is an illustration of the components included in the factory software installation system in one embodiment of the system.
Figure 3:
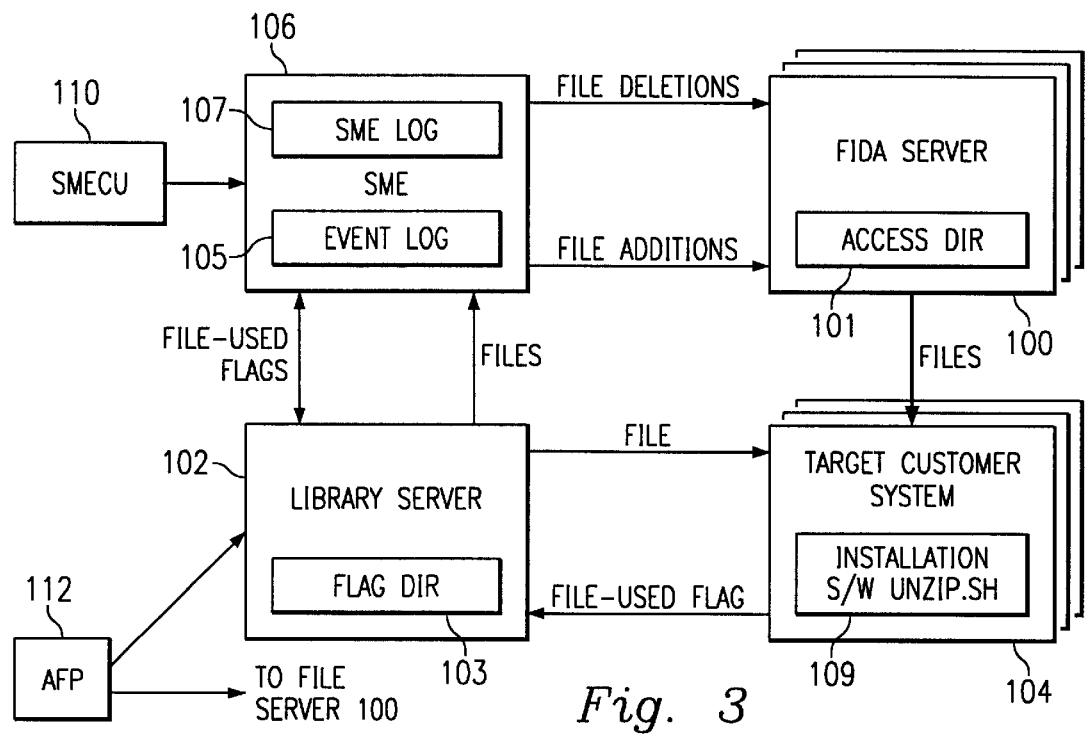
FIG. 3 is a block diagram which shows the connections between the components in the system.

Referring to FIG. 1, a typical data processing system is shown which is an example of a typical system 104, as shown in FIGS. 2 and 3, that may be configured. Typically, this system is a client system which will be used as a personal computer. Of course, workstations, servers and the like may also be configured and are contemplated. A central processing unit (CPU) 10, such as an Intel Pentium microprocessor, commercially available from the Intel Corporation is provided and interconnected to the various other system components by a system bus 12. Read only memory (ROM) 16 is connected to CPU 10 via bus 12 and includes the basic input/output system (BIOS) that controls the basic computer functions. Random access memory (RAM) 14, I/O adapter 18 and communication adapter 34 are also connected to system bus 12. I/O adapter 18 may be a small computer system interface (SCSI) adapter that communicates with a disk storage device 20, such as a hard drive, floppy disk drive 21, CD-ROM 23, or the like. Communications adapter 34 interconnects bus 12 with an outside network enabling the data processing system to communicate with other such systems. A modem 40 is coupled to microprocessor 10 via bus 12. Modem 40 may be connected via a telephone line to various of the on-line computer services and the Internet. User input/output devices are also connected to system bus 12 vias user interface adapter 22 and display adapter 36. Keyboard 24, track ball 32, mouse 26, pointer 33 and speaker 28 are all interconnected to bus 12 via user interface adapter 22. Display monitor 38 is connected to system bus 12 by display adapter 36. In this manner, a user is capable of inputting information to the system through keyboard 24, trackball 32, mouse 26, pointer 33, or the like, and receiving output from the system via speaker 28 and display 38. Additionally, an operating system (OS) such as DOS, OS/2, Windows 95, Windows NT, or the like is used to coordinate the functions of the various components shown in FIG. 1.

FIG. 2 is an illustration of the various systems included in one example embodiment. More particularly, the FIDA servers (file servers) are shown by reference numeral 100. It can be seen that, as an example, three (3) file servers are shown in FIG. 2. However, it should be understood that the system contemplates 10, 20 or more interconnected file servers. These file servers are connected to one another by a network 105, such as a local area network (LAN), ethernet, token ring network, or the like.

From FIG. 2 it can also be seen that file servers 100 are connected (also by network 105) to the target computer systems 104 to be loaded with the specified software programs. Again, only three (3) target systems are shown, but it will be understood that the present system literally thousands of target systems connected to network 105 which can be loaded in parallel. The target systems 104 will include personal computers being loaded with the Windows OS, word processing software, device drivers, and the like. Target customer systems 104 may include: (1) personal computers (PC) requiring the Windows OS, word processing software, fax/modem software, drivers and the like; (2) workstations to be loaded with the Unix OS, computer aided design (CAD) programs, etc.; or (3) personal digital assistants (PDAs) which need to be loaded with the Windows CE operating system. Of course, target customer computers 104 can include many other types of data processing systems, modules, embedded systems or the like in which it is desirable to pre-load software before the system is received by the end user.

Library server 102 is also connected to target systems 104 and includes all of the software available to be loaded onto the customer computers 104. Optical storage 103 is coupled to library server 103 and stores the majority of the software programs available to be loaded on customer computers 104. Library server 102 and optical storage 103, along with tape drive 108 may be organized using a hierarchical storage management system which basically maintains the most recently used programs in the library server storage with more least recently used files hierarchically distributed between the optical storage and tape drive. This type of HSM system contemplated in one embodiment is available for use in conjunction with library server 102 since there is a one to one relationship between server 102 and optical storage 103.

It should be noted that even with the advances made to hardware storage devices, it is common to use various compression techniques to pack more software programs into available storage resources. In one embodiment, AFP 112 will provide the software to the files servers 100 and library server 112 as compressed "zip" files. Compressing the software will include using various algorithms and techniques to allow the information contained in the software to be stored in a minimum amount of hardware storage. These files will have a ".zip" extension, i.e. filename.zip. One, or more zip files corresponding to a specific software program are then loaded by AFP 112 onto file servers 100 and library server 102. Target systems 104 are installed with certain installation programs 109 that will search file servers 100 for specified files and, when found on the files servers, download the software to the target systems. The downloading process will include "unzipping" the located zip files and storing them on the hard drive of the target computer. Those skilled in the art will understand that "unzipping" (also referred to in the industry as "unpacking") as used herein refers to the decompressing of the compressed zip files using the algorithms and techniques to restore the minimized information to its normal size and storing the decompressed files on the computer.

In a preferred embodiment the software 109 (FIG. 3) used by the target computer to search for specific zip files in the file servers is a shell script, or batch file, that is run on the target computer under the Thompson Toolkit Command Interpreter (Shell). In particular, the "unzip.sh" shell script will be used to retrieve the available files from the file servers. This unzip.sh file will also be modified, as described below, to search the library server after search the file server for a specific zip file. This modification is necessary to provide SME 106 with a "hook" into the installation software. That is, the unzip.sh file will provide an interface between the installation software 109 and SME 106. The absence of the requested file on the FIDA 100 server causes the installation software to access the file on the SME library 102.

The operation will now be described in conjunction with FIG. 3 which is a block diagram of the components shown in FIG. 2. Target customer systems 104 are shown coupled to file servers 100. The target computers 104 are also connected to library server 102, which in turn is coupled to storage management engine 106. The storage management engine configuration utility (SMECU) 110 is used to provide a graphical user interface (GUI) to SME 106 and allow an operator to control the factory download system by setting various parameters. SMECU will be discussed in greater detail with reference to FIG. 6. SME 106 is connected to file servers 100, as well as library server 102. Automated file promotion (AFP) 112 is a system including a database of all the software to be made available for loading on target systems. New programs received from the various software vendors are input to the AFP system for distribution to the library server 102. It should be noted that while only a single library server 102 is shown in FIGS. 2 and 3, redundant systems are contemplated such that at least one backup library server will be installed to ensure maximum availability of the programs for loading onto the target computers.

In one preferred embodiment SME 106 can be a server computer system, such as a Dell PowerEdge 2200 server running the Windows NT 4.0 operating system. A SME application program specifically designed to control the factory download installation system will also be running on the SME hardware. Windows NT event log 105 and SME log 107 are also shown. Event log 105 will contain system level events, while SME log 107 will include a record of file transfers between library server 102 and file servers 100, as well as the deletion of any unused files from file servers 100.

Library server 102 may also be a server computer such as a Dell PowerEdge 6100 running the Netware operating system and having additional storage capacity of approximately 85 Gigabytes (GB). A preferred embodiment also contemplates using a hierarchical storage management system that would be attached library server 102 and use primary (disk), secondary (optical) and tertiary (tape) storage to give a total of approximately 2.7 Terrabytes (TB) of capacity. File servers 100 are configured in a manner similar to library server 102, but do not include the additional storage capacity associated with the library server.

As noted above, the system solves the problem of managing the enormous amount of software required to be available for down loading to customer systems by turning file servers 100 into "cache" storage. The first step in creating this cache is to determine which files are to remain resident on the file servers 100. SME 106 is designed to delete older zip files from the file servers 100. Typically, an operating system will include a directory that maintains entries for the various files installed on the data processing system. This directory includes entries for file name, file type, file size, last modification date and last access date of the file. Normally, an operating system will provide a programmatic interface for the retrieval of the directory entry information. The Windows NT Operating System provides such an interface to the remote NetWare Operating System's directory entry. Thus, the Windows NT based SME 106 reads the last access dates in directory 101 in the file servers 100. It should be noted that Netware and NT are used herein by way of example only. Those skilled in the art will understand that many other operating systems and programs could be used to implement the system.

Once a link is established between SME 106 and file servers 100, it can then be determined by reading directory 101 when the last access to each file stored in file servers 100 occurred. This date parameter can be set using the SMECU interface, described in more detail below. For example, it may be determined to delete those files which have not been accessed in the past six (6) months. In this case, SME 106 will read the last access dates of files in file servers 100. Those files having a date greater than or equal to six months will then be deleted, freeing up space in the file server storage. The deleted files are still maintained on library server 102 and remain available for use by a target computer. In this manner, the least recently used files are maintained only on the library server 102. The additional storage space in file servers 100 is then available for use when new programs are to be installed from AFP system 112.

The operation of a target computer to obtain the desired software programs will now be described. As previously mentioned, a program is installed on target computers 104 that will search for the various software to be downloaded. More particularly, this software includes the unzip.sh script file and the unique file server name for the software being requested. That is, the target system installation software knows the location of the program to be downloaded from the file server. When the desired file is found on the server, the download occurs to the target computer by "unzipping" the file and loading it on the hard drive of the target computer.

However, the unzip.sh file is modified such that when the desired file is not found on file servers 100 the library server 102 is then searched for the desired file. Thus, once it is determined that the desired file is not on the file server a request is sent by the target computer software to the library server for the software. Since the library server stores all of the known software available to be downloaded, the desired file should be present (library server 102 is a superset of file servers 100). The requested file is then downloaded from library server 102 directly to target computer 104. If the requested software is not present on library server 102, then a system error has occurred and a notification is sent to the system administrator. In this case the target system 104 generates an error message that the download has failed.

Library server 102 includes a flag directory 103. When the unzip.sh file from the target system software cannot find a desired file on file servers 100 and requests the file from the library server, a "file-used" flag is set in directory 103 to serve as notification that a specific file has been requested by a target customer computer and that particular file is not present on file servers 100.

The system administrator, via the SMECU, will set SME 106 to periodically read directory 103 in library server 102 to determine if any "file-used" flags have been set. When SME 106 determines that a flag has been set, the file corresponding to the flag is then transferred from library server 102 to file servers 100. In this manner, the most recently used files are maintained in file servers 100. It can be seen how the operation causes file servers 100 to become file server cache such that only the most recently used files are maintained thereon. While the least recently used files are stored on the library server, which is analogous to "main memory".

The storage management engine 106 may be implemented as a 32 bit C++ program written to run on the Windows NT 4.0 (or higher) operating system. Basically, SME 106 is responsible for maintaining the file server cache 100 by: (1) deleting zip files in the file servers that have not been accessed in a particular period of time; and (2) restoring recently accessed zip files to the file servers 100 from the library server 102 when the files are not present on servers 100.

SME 106 will be implemented as a Windows NT service. This will allow the program to run unattended (without a user logged into the system) and will also allow the SME to start automatically if the system is rebooted.

Initially, when the SME starts it will read the configuration information from the NT registry, including: (1) network names of file servers 100; (2) network name of library server 102; (3) credentials to use to log on to the file server; (4) e-mail address(es) of the network administrator(s); and (5) time intervals for checking for old files on the file servers and flags in the library server.

The SME program will periodically cycle through the list of FIDA file severs 100 searching for files that have not been accessed in the given period of time as defined in the NT configuration registry. When a file is discovered that is to be removed, the SME will first make sure it exists in the library server and then delete the file from the file server. SME 106 will also check the flag directory in library server 102 to determine whether any files should be restored to the file servers. Of course, other implementations are contemplated. For example, the library server could be configured to only maintain those files which are unaccessed beyond the selected period (and not store any recently accessed files) such that these files must be transferred from the file servers 100 to the library server 102.

SME 106 maintains two (2) log files in SME log 107 (FIG. 3) in order to keep a record of all actions. The Fida2Lib.txt file will be used to keep a record of all files deleted from file servers 100. The Lib2Fida.txt file will be used to keep a record of all files copied from the library server 102 to file server 100. Both files will be cyclical and will hold only the most recent records. SME 106 through its GUI 110 will contain functionality to send an e-mail to the list of system administrators once a day notifying them that the system is operational. If the administrators do not receive any SME e-mail, then they will know to check on the system. Another log used by SME 106 is the Windows NT event log 105 (FIG. 3). Along with other events, SME 106 logs startup, shutdown and the like in the Windows NT event log 105. Event log 105 is accessible by the system administrator from the NT user interface.

Figure 4:
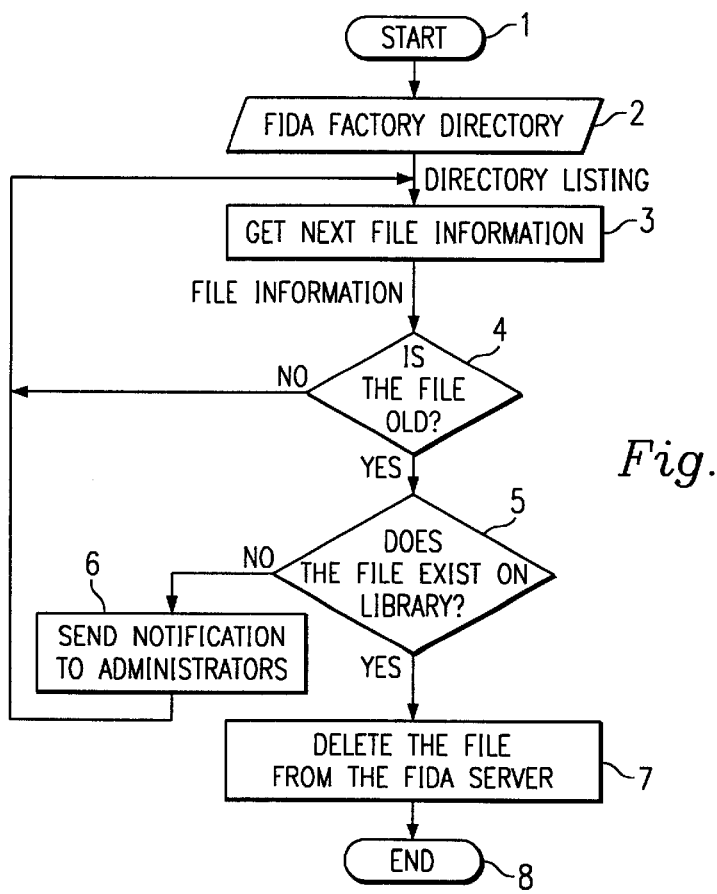
FIGS. 4 and 4a are flowcharts showing the various process steps implemented by a storage management engine (SME) to maintain the most recently used software in the file server storage.

Next, a more detailed description of the process of deleting, or "pruning", the least recently used files from file servers 100 will be provided in conjunction with the flowchart of FIG. 4.

At step 1, the program is started and at step 2 SME 106 accesses the directory entry for the last access date of the files in file servers 100. The process continues to step 3 where the next file information is obtained, i.e. the next sequential file in the directory is read. At step 4 it is determined if the file obtained in step 3 is old. In particular, has the file remained unaccessed for a time period greater than the time specified by the system administrator. If not, then the file in question is to remain on the file servers 100 and the process loops back to step 3 where the next file in the directory is read. However, if at step 4 it is determined that the file is old, the method proceeds to step 5 where it is determined whether the unaccessed file exists on the library server. When the unaccessed file does exist on the library server (the usual case) then this old file is deleted at step 7. But, if it is determined at step 5 that the unaccessed file does not exist on library server 102, then at step 6 a notification is sent to the system administrator alerting them of this error condition. In this case, the file is not deleted from file servers 100 to ensure that at least one copy remains resident on the factory software installation system. Once the error notice is sent to the system administrator, the SME process returns to step 3 and retrieves the last access date for the next file in the file server directory listing. Subsequent to the deletion of the old file at step 7, the process continues to step 8 and ends.

Figure 4A:
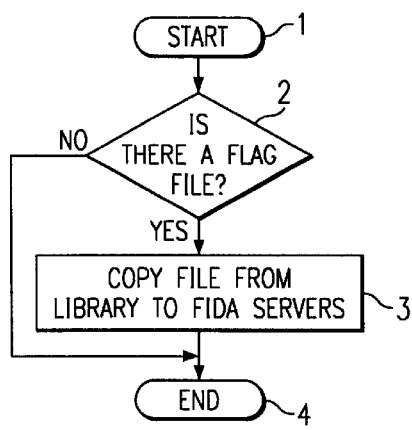

Referring to the flowchart of FIG. 4a, the process of moving previously deleted files from library server 102 to file servers 100 will now be described. At step 1 the process is started and step 2 determines if there is a flag present in flag directory 103 of library server 102. A flag will indicate that a particular file was not available on file servers 100 and has been requested from library 102 by a target system 104. If no flags are present, the process continues to step 4 and ends. However, if at least one flag exists in the "file-used" directory 103 of library server 102, then that particular file, which was requested by a target computer, is copied from library server 102 to file servers 100. Subsequent to copying the used files to file servers 100 at step 3 the process ends at step 4.

As noted above, modifications were made to a script file, unzip.sh, loaded into a customer system in order for a search to be made of the library server if the desired file is not found in the file servers. More particularly, the code from the target system first searches each file server directory ($FOREST) and each account level on those server directories ($FULL_NAME) for the zip file to be loaded, i.e. a filename and extension ($filename.$ext) search is undertaken for those accounts. If the requested zip file is found, a $ZIPERR register is set to 0 and ARCHIVE contains the full path to the zip file for downloading. After completion of this code block, if $ZIPERR is not set to 0, i.e. the file was not found in file servers 100, the code flow branches to a new script file, CHECKLIB.EXE which makes a dynamic connection to the library server 102 and continues the zip file search. If the file is found on library server 102, the $ZIPERR register is then set to 0 and ARCHIVE points to the full path of the zip file on the library server. After locating the requested file on the library server the process returns to unzip the file for downloading. At this point if $ZIPERR was set to 0, a local flag (LIB_USED) is set to indicate that the zip file was found on the library server. Unzipping of the file continues if the file was found on local file server 100, using $ARCHIVE as the full path to the zip file. Prior to exiting the code, $LIB_USED is used to determine if the dynamic connection to the library server should be terminated. If LIB_USED is a 1, the CHECKLIB.EXE program is used to disconnect the dynamic network connection between the target computer 104 and library server 102.

The operation of downloading software by a target system will now be further described with reference to the flow chart of FIG. 5. At step one the process starts and step 2 builds the filename based on the request from the customer computer 104 or uses the "*.zip" extension if no other extension is provided. At step 3 all of the severs 100 ($FOREST) are initialized to X. The exit state is initialized to FAIL and NOT FOUND at step 4. The file servers 100 are searched by filename and extension at step 5. Further, at step 5 the drives defined by $FOREST are all searched and $ARCHIVE is set to the path and filename that is searched. The $ZIPERR register is set to 0 if the file is found, also at step 5. At step 6 it is determined whether the file was found on the servers 100. If so, the file is unzipped at step 10. Step 11 then determines if the $ZIPERR register is set to 0. If so, at step 12, a utility is used to verify that the correct file has been located. More particularly, the filename, file size and last modification date are compared to ensure that the located file is actually the requested file. Step 13 then determines whether all of the files have been verified to correspond to the requested files. The requested files are then downloaded to the target system from file server 100 at step 14. Also at step 14, if the $LIB_USED flag is set to 1, which indicates that the file was found in the library server 102, not file server 100, then the connection to the library server is disconnected at step 14. Otherwise, there will be no library connection to disconnect since it was not necessary to search the library server because the file was found in the FIDA file servers. The process is then exited at step 16.

However, if at step 6 it was determined that the requested file was not found on FIDA file servers 100, then the CHECKLIB.EXE is called at step 7 to search for the file. At step 8, it is determined whether the requested file was found on the library server. If so, the process continues to step 9 where the $LIB_USED flag is set to indicate that the file was found at the library server. If at step 8 it was determined that the requested file does not exist in the library server an error has occurred and the drive mapping from the library server is disconnected at step 16. The process is then exited with an error message at step 17.

Subsequent to step 9, the method proceeds to step 10 where the file is unzipped. At step 11, the $ZIPERR is again checked for 0. If a non-zero number is present, then an error has occurred and the process jumps to step 16. A program to verify the file retrieved from the library server is then run at step 12. If, at step 13, the files are verified as correct, then the file is downloaded to the target system and the drive mapping from the library server is then disconnected at step 14 if the $LIB_USED flag is set to 1 (a connection will exist to the library server since that is where the file was located). If the retrieved files are not verified at step 13, then an error has occurred and the process continues to step 16 and exits with an error message at step 17.

Figure 6:
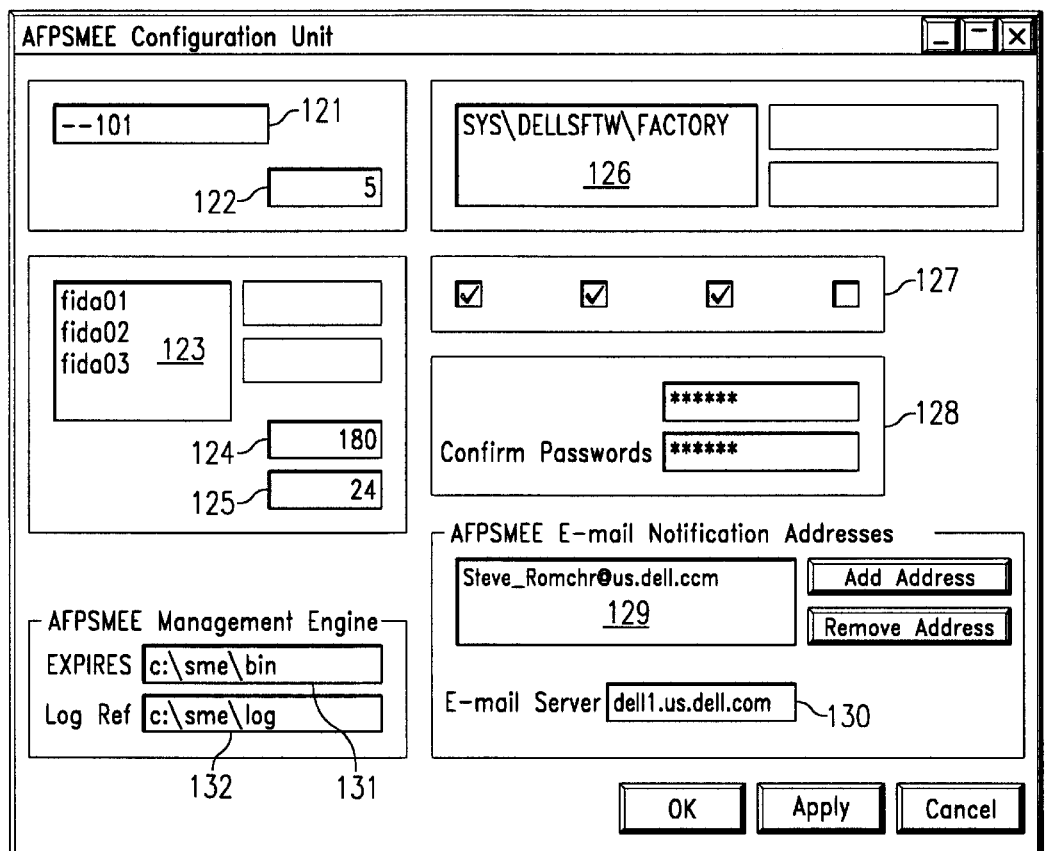
FIG. 6 is a depiction of a graphical user interface that is used to control the storage management engine.

The SMECU will now be described in connection with FIG. 6 which is a screen shot of the user interface 120 that allows an operator, such as a system administrator to control the factory download installation system.

Interface 120 includes an authentication mechanism 128 which provides a network connection to file servers 100 and library server 102. System security is also provided and only allows an operator with authorized credentials, i.e. valid password to log into the network. Field 121 includes the name of the library server which stores all of the software that is available to be downloaded onto a target system. The SME service periodically checks library server directory 103 for any "file-used" flags and moves the associated files back to the appropriate servers when a flag is set by a target system that has accessed the library. Field 122 allows the system administrator to set the period (e.g. minutes) between checks of library directory 103 by SME 106.

File servers 100 are also controlled by SME 106 through this interface. The name of the file servers being used are shown in field 123. The SMECU has the capability to add and remove servers as the system configuration changes. SME 106 periodically checks the servers listed in field 123 for files that have not been accessed for a configurable number of days. The number of days is set by the operator using field 124. It can be seen that a period of 180 days has been selected for this example. If a file is discovered that has remained unaccessed for greater than or equal to 180 days then it is deleted (if the file is present in the library server) and a target system will have to access the file from the library server. Field 125 allows the system administrator to set the time interval for SME 106 to search file servers 100 for unaccessed files. As seen from FIG. 6, SME will search file servers 100 once a day (every 24 hours) for the least recently used files. Field 126 is the managed volume/ directory paths which define the actual directories in the servers (both file server 100 and library server 102). For file servers 100, these paths are checked for managed files that have not been recently accessed and can be removed. On the library server 102 these directories provide the path to the recently used managed files that are restored to the file servers 100.

SMECU 110 includes a mechanism to allow only files with certain extensions to be managed by the SME. Field 127 allows an operator to select which types of files are to be managed by checking one of four boxes. The previously discussed "zip" files are managed by checking box ".Z*". Other file types, such as image files (".IMG"), ghost files (".GHO") and the like are also manageable by the SME. While field 127 shows four (4) types of files than can be managed, the present invent contemplates managing many other types of files. In a preferred embodiment, SME 106 will provide a safeguard by only allowing 100 files having a .Z* extension and only eight (8) files each having the other extensions to be deleted in a given period. It would be rare for 100 or more files to legitimately need deletion in a single period and SME 106 will minimize any potential system malfunction by preventing a massive deletion from occurring without operator involvement.

The records, configuration data and executables that make up the SME reside in the EXE Path field 131 and its log files reside in field 132. These paths lead to the SME engine itself and should not need to be changed unless the software has been installed in some place other than this recommended path (C:\SME).

Figure 5:
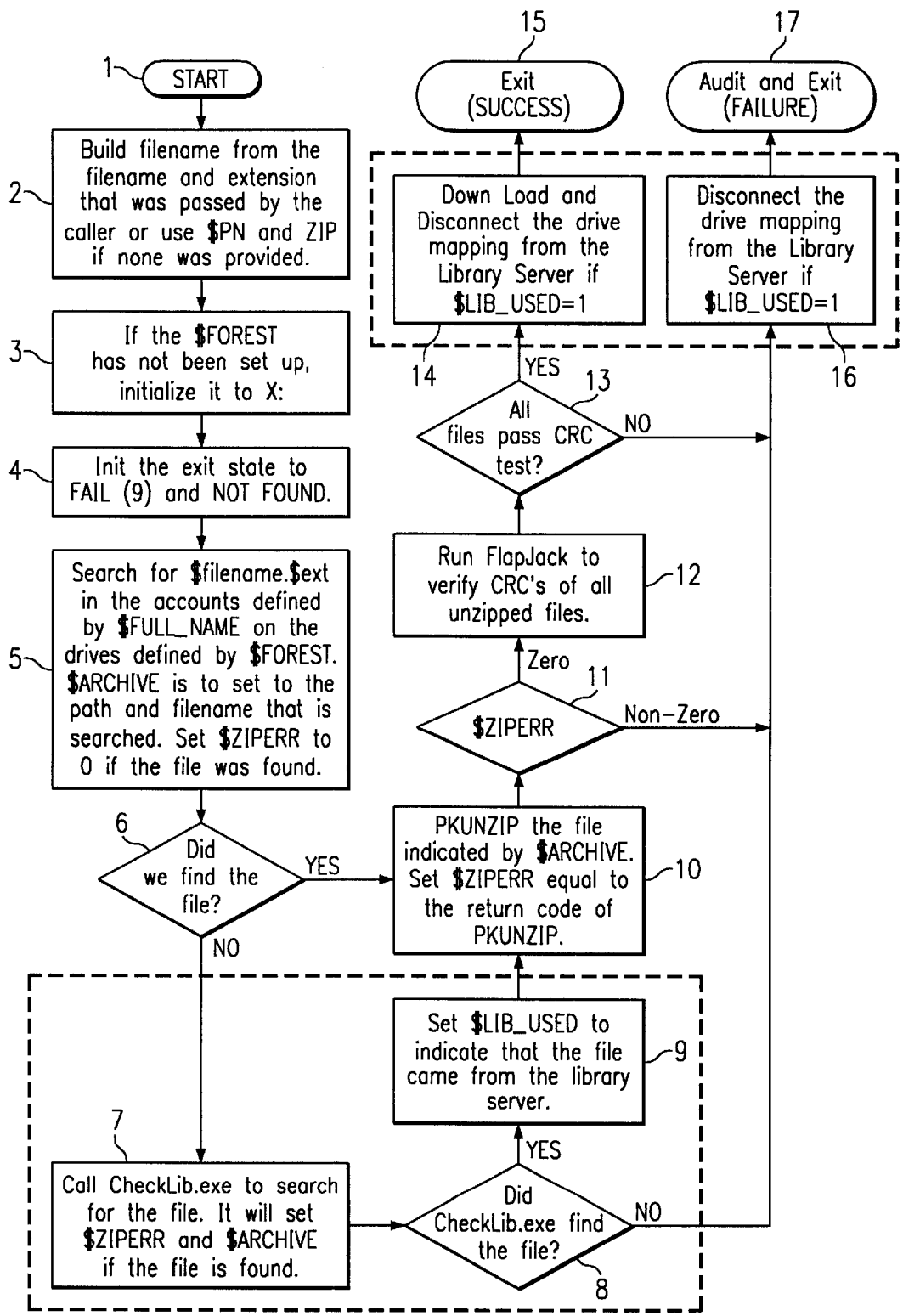
FIG. 5 is another flow chart showing a method by which the target customer computer system requests various files to be loaded from the file server and, when necessary, the library server.

SMECU 110 includes a service to notify one or more system operators if certain conditions occur (e.g. steps 8, 11 and 13 of FIG. 5). The e-mail address of the administrator(s) to be notified is provided in field 129 and the e-mail server is entered in field 130. In the event of a shutdown, error or other malfunction the operator can be automatically contacted. Additionally, the telephone number of a messaging pager could also be entered in field 129 to provide a brief textual message to an operator even when the operator is not able to access e-mail.

Although certain preferred embodiments have been shown and described, it should be understood that many changes and modifications may be made therein without departing from the scope of the appended claims.

What is claimed is:

1. A software installation system, comprising: at least one target computer including installation software, the target computer to be loaded with a software file;
  at least one file server that stores a first set of most recently used software files;
  a library server that stores said first set of software files and a second set of least recently used software files; and
  a storage management engine connected to the target computer and the library server;
  and the installation software being used to retrieve available files from the file server being modified to search the library server after searching the file server for a specific file;
  wherein said target computer is loaded with said software file from said file server when said software file is included in said first set of software files, and wherein said target computer is loaded with said software file from said library server when said software file is included in said second set of software files; and
  wherein in response to the target computer being loaded with said software file from said library server, said storage management engine causes said software file to be added to said first set of software files on said file server.

2. A system according to claim 1 wherein said storage management engine is for maintaining said first set of most recently used software files on said file server.

3. A system according to claim 2 wherein said storage management engine comprises:
  a directory that stores a date when each software file in said first set of software files is accessed by said target computer;
  means for reading said date in said directory; and
  means for deleting from said first set of software files the software files having a corresponding date older than a predetermined date.

4. A system according to claim 3 wherein said storage management engine further comprises:
  a flag directory for maintaining at least one flag corresponding to the software files in said second set of software files that are loaded to said target computer;
  means for reading said flag directory; and
  means for transferring, from said second set of software files on said library server to said first set of software files on said file server, the software file which has been loaded to said target computer.

5. A system according to claim 4 wherein said target computer comprises an installation program for initially requesting said software file from said file server.

6. A system according to claim 5 wherein said installation program comprises means for requesting said software file from said library server when said software file is not stored on said file server.

7. A system according to claim 6 wherein said installation program further comprises means for setting said at least one flag in said flag directory when said software file is requested from said library server.

8. A system according to claim 7 further comprising a log for maintaining a first record of the software files in said first set of software files deleted from said file server and a second record of the software files transferred from said second set of software files on said library server to said first set of software files on said file server.

9. A system according to claim 8 wherein said storage management engine further comprises a user interface including a plurality of fields for entering parameters used to control said software installation system.

10. A system according to claim 9 wherein said parameters comprise:
  the predetermined date;
  a first time period for searching said directory for the software files in said first set of software files on said file server having a date older than said predetermined date;
  a second time period for searching said flag directory for the software files in said second set of software files on said library server that have been requested by a said target computer;
  specific types of files to be included in said first set of software files and said second set of software files; and
  system administrator identification information including e-mail address and telephone number.

11. A system according to claim 3 wherein said means for deleting comprises:
  means for determining that said software files to be deleted from said file server are stored on said library server; and
  means for deleting only the software files from said file server having a date older than said predetermined date which are stored on said library server.

12. A method for installing software, comprising:
  storing, on at least one file server, a first set of most recently used software files;
  storing, on a library server, said first set of software files and a second set of least recently used software files;
  installing installation software on a target computer;
  loading the target computer with a software file from said file server in response to said software file being in said first set of software files;
  connecting the target computer and the library server to a storage management engine;
  using the installation software to retrieve available files from the file server and to search the library server after searching the file server for a specific file;
  loading said target computer with said software file from said library server in response to said software file being in said second set of software files; and
  in response to loading said target computer with said software file from said library server, adding the software file from the library server to said first set of software files on the file server.

13. A method according to claim 12 further comprising maintaining, by a control system, said first set of most recently used software files on said file server.

14. A method according to claim 13 wherein said maintaining comprises:
   storing, in a directory in said file server, a date when each software file in said first set of software files is accessed by said target computer;
   reading said date in said directory; and
   deleting, from said first set of software files stored on said file server, the software files having a date older than a predetermined date.

15. A method according to claim 14 wherein said maintaining further comprises:
   recording, in a flag directory in said library server, at least one flag corresponding to the files in said second set of software files that are loaded to said target computer;
   periodically reading said flag directory; and
   transferring, from said library server to said file server, the files in said second set of software files which have been loaded to said target computer.

16. A method according to claim 15, further comprising requesting, by an installation program on said target computer, said software file to be initially loaded from said file server.

17. A method according to claim 16 wherein said requesting further comprises subsequently requesting said software file from said library server when said software file is not stored on said file server.

18. A method according to claim 17 wherein said subsequently requesting further comprises setting said flag in said flag directory when said software file is requested from said library server.

19. A method according to claim 18 further comprising maintaining a log having a first record of the software files in said first set of software files deleted from said file server and a second record of the software files transferred from said second set of software files on said library server to said first set of software files on said file server.

20. A method according to claim 19 further comprising providing a user interface to said control system having a plurality of fields for entering parameters used to control said control system.

21. A method according to claim 20 wherein said providing a user interface comprises:
   entering the predetermined date;
   entering a first time period for searching said directory for the software files in said first set of software files on said file server having a date older than said predetermined date;
   entering a second time period for searching said flag directory for the software files in said second set of software files on said library server that have been requested by a said target computer;
   selecting specific types of files to be included in said first set of software files and said second set of software files; and
   entering system administrator identification information including e-mail address and telephone number.

22. A method according to claim 14 wherein said deleting comprises:
   determining that said software files older than said predetermined date are stored on said library server, and
   deleting, from said file server, only the software files having a date older than said predetermined date and stored on said library server.

23. A computer system, comprising:
   at least one file server that stores a first set of most recently used software files;
   a library server that stores said first set of software files and a second set of least recently used software files;
   at least one target computer including installation software, the target computer being loaded with a software file from said file server when said software file is in said first set of software files and said target computer is loaded with said software file from said library server when said software file is in said second set of software files the installation software being used to retrieve available files from the file server and being modified to search the library server after searching the file server for a specific file;
   a directory for storing a date when each software file in said first set of software files is accessed by said target computer;
   means for reading said date in said directory;
   means for deleting said software files from said first set of software files stored on said file server when said date is older than a predetermined date and said file is stored on said library server;
   a flag directory for maintaining at least one flag corresponding to the software files in said second set of software files that are loaded to said target computer;
   means for periodically reading said flag directory; and
   means for transferring from said second set of software files on said library server to said first set of software files on said file server in response to the software file being loaded to said target computer from said library server.

24. A system according to claim 23 wherein said target computer comprises an installation program for initially requesting said software file from said file server, and for requesting said software file from said library server when said software file is not stored on said file server.

25. A system according to claim 24 wherein said installation program further comprises means for setting said at least one flag in said flag directory when said software file is requested from said library server.

26. A system according to claim 25 further comprising a log for maintaining a first record of the software files in said first set of software files deleted from said file server and a second record of the software files transferred from said second set of software files on said library server to said first set of software files on said file server.

27. A system according to claim 26 wherein said control system further comprises a user interface including a plurality of fields for entering parameters used to control said control system.

28. A system according to claim 27 wherein said parameters comprise:
   the predetermined date;
   a first time period for searching said directory for the software files in said first set of software files on said file server having a date older than said predetermined date;
   a second time period for searching said flag directory for the software files in said second set of software files on said library server that have been requested by a said target computer;
   specific types of files to be included in said first set of software files and said second set of software files; and
   system administrator identification information including e-mail address and telephone number.

* * * * *